United States Patent
Brewer et al.

(10) Patent No.: US 12,389,994 B2
(45) Date of Patent: Aug. 19, 2025

(54) BIODEGRADABLE MEMORY-CARD HOLDER

(71) Applicant: ProGrade Digital Incorporated, San Jose, CA (US)

(72) Inventors: Wes Brewer, Irvine, CA (US); Francisco Pardorla, Fremont, CA (US)

(73) Assignee: ProGrade Digital Incorporated, San Jose, CA (US)

( * ) Notice: Subject to any disclaimer, the term of this patent is extended or adjusted under 35 U.S.C. 154(b) by 0 days.

(21) Appl. No.: 18/713,808

(22) PCT Filed: Jan. 18, 2023

(86) PCT No.: PCT/US2023/011006
§ 371 (c)(1),
(2) Date: May 28, 2024

(87) PCT Pub. No.: WO2023/204879
PCT Pub. Date: Oct. 26, 2023

(65) Prior Publication Data
US 2025/0017338 A1    Jan. 16, 2025

Related U.S. Application Data (60) Provisional application No. 63/332,058, filed on Apr. 18, 2022.

(51) Int. Cl.
| | | |
|---|---|---|
| A45C 11/18 | (2006.01) | |
| A45C 13/10 | (2006.01) | |
| B32B 5/06 | (2006.01) | |

(52) U.S. Cl.
CPC .......... *A45C 11/18* (2013.01); *A45C 13/1053* (2013.01); *B32B 5/06* (2013.01); *A45C 2011/188* (2013.01); *B32B 2307/7163* (2013.01)

(58) Field of Classification Search
CPC ........ A45C 11/18; A45C 13/1053; B32B 5/06
(Continued)

(56) References Cited

U.S. PATENT DOCUMENTS

| | | | |
|---|---|---|---|
| 7,699,553 B1 * | 4/2010 | Merzon .................. | A45C 13/02 |
| | | | 402/73 |
| 8,132,668 B2 | 3/2012 | Davis | |

(Continued)

FOREIGN PATENT DOCUMENTS

| | | |
|---|---|---|
| CN | 2667576 Y | 12/2004 |
| JP | 2003170980 A | 6/2003 |

(Continued)

OTHER PUBLICATIONS

"International Application Serial No. PCT US2023 011006, International Preliminary Report on Patentability mailed Aug. 1, 2024", 5 pgs.

(Continued)

*Primary Examiner* — Allyson N Trail
(74) *Attorney, Agent, or Firm* — Schwegman Lundberg & Woessner, P.A.

(57) ABSTRACT

Various embodiments include, for example, a memory-card holder including a one-piece, unitary tray formed entirely from a bio-degradable material. The tray has a cover portion and a bottom portion formed therein. At least one of the cover portion and the bottom portion has an indentation to accept a digital memory-card. The tray further includes a protrusion area on at least three sides projecting outward from and substantially parallel to the cover portion and the bottom portion. A hinge is integrally formed into the unitary tray and between the cover portion and the bottom portion. The hinge is arranged to allow the cover portion to fold over the bottom portion of the tray. A closure tab and an insertion slot are formed on distal, opposing ends of the tray and (Continued)

arranged to latch the cover portion and the bottom portion to one another. Other devices, apparatuses, and arrangements are described.

20 Claims, 11 Drawing Sheets

(58) Field of Classification Search
USPC .......................................................... 235/486
See application file for complete search history.

(56) References Cited

U.S. PATENT DOCUMENTS

| | | | |
|---|---|---|---|
| 2008/0110071 A1* | 5/2008 | Farnsworth | ........ G11B 33/0422 |
| | | | 40/722 |
| 2008/0272025 A1 | 11/2008 | Lee | |
| 2009/0014344 A1 | 1/2009 | Altman et al. | |
| 2009/0059542 A1* | 3/2009 | Walker | .................... G06K 19/00 |
| | | | 361/752 |
| 2009/0261155 A1 | 10/2009 | Wynalda, Jr. et al. | |
| 2010/0122923 A1 | 5/2010 | Chin | |
| 2010/0170814 A1* | 7/2010 | Davis | ................. G11B 33/0494 |
| | | | 206/307 |
| 2011/0232141 A1* | 9/2011 | Sapp | .................... B42D 15/022 |
| | | | 40/124.03 |
| 2012/0091018 A1* | 4/2012 | Bock | ....................... B42F 7/065 |
| | | | 206/307 |
| 2012/0267276 A1 | 10/2012 | Hunter et al. | |
| 2015/0224808 A1* | 8/2015 | Shlonsky | ............... B42D 15/04 |
| | | | 40/124.02 |
| 2017/0297802 A1* | 10/2017 | Davis | ................... B65D 25/101 |
| 2019/0001732 A1* | 1/2019 | Ongsitco | .............. B42D 15/022 |
| 2022/0032586 A1* | 2/2022 | Cham | .................... B32B 27/10 |
| 2022/0402671 A1* | 12/2022 | Dickman | ........... B65D 73/0064 |
| 2024/0158149 A1* | 5/2024 | Armenta | .............. B65D 65/466 |
| 2024/0286813 A1* | 8/2024 | Ashton | ................ B65D 65/466 |

FOREIGN PATENT DOCUMENTS

| | | |
|---|---|---|
| JP | 2011025975 | 2/2011 |
| JP | 2025503336 A | 1/2025 |
| WO | WO-9614636 A1 | 5/1996 |
| WO | WO-2023204879 A1 | 10/2023 |

OTHER PUBLICATIONS

"International Application Serial No. PCT/US2023/011006, International Search Report mailed May 12, 2023", 3 pgs.
"International Application Serial No. PCT/US2023/011006, Written Opinion mailed May 12, 2023", 4 pgs.
"European Application Serial No. 23792301.6, Extended European Search Report mailed Feb. 17, 2025", 7 pgs.

* cited by examiner

SECTION A-A

BIODEGRADABLE MEMORY-CARD HOLDER

CLAIM OF PRIORITY

This patent application is a U.S. National Stage Application under 35 U.S.C. 371 from International Application No. PCT/US2023/011006, filed Jan. 18, 2023, and published as WO 2023/204879 on Oct. 26, 2023, which claims priority to U.S. Provisional Application Ser. No. 63/332,058, entitled, "BIODEGRADABLE MEMORY-CARD HOLDER," filed 18 Apr. 2022; the disclosure of which are incorporated herein by reference in their entirety.

TECHNICAL FIELD

Embodiments described herein relate generally to digital memory cards and packaging for the memory cards. More specifically, the disclosed subject matter relates to a biodegradable type of packaging for a digital data-storage memory card.

BACKGROUND

Digital memory cards are known in the art and are used for storing, for example, data from cinematography, videography, and still photography. The data stored on these memory cards can comprise extremely large datasets (e.g., 512 gigabytes (GB), 1 terabyte (TB), or higher). However, contemporary packaging materials (known in the art as "plastic jewel-cases") are comprised of non-biodegradable materials, such as plastic.

However, many products used by consumers can be damaged by the same things that allow for a package to be biodegradable. For example, a biodegradable package will normally not be made of plastic. Although consumer products formed from plastic materials may be recycled, it will not biodegrade at the rate of other materials.

For example, estimates of the worldwide annual production of non-degradable plastic ranges from 350 million to 400 million tons. Studies have shown that one common plastic, polyethylene, showed only partial degradation and negligible weight loss after being buried more than three decades in moist soil.

Figure 1A:
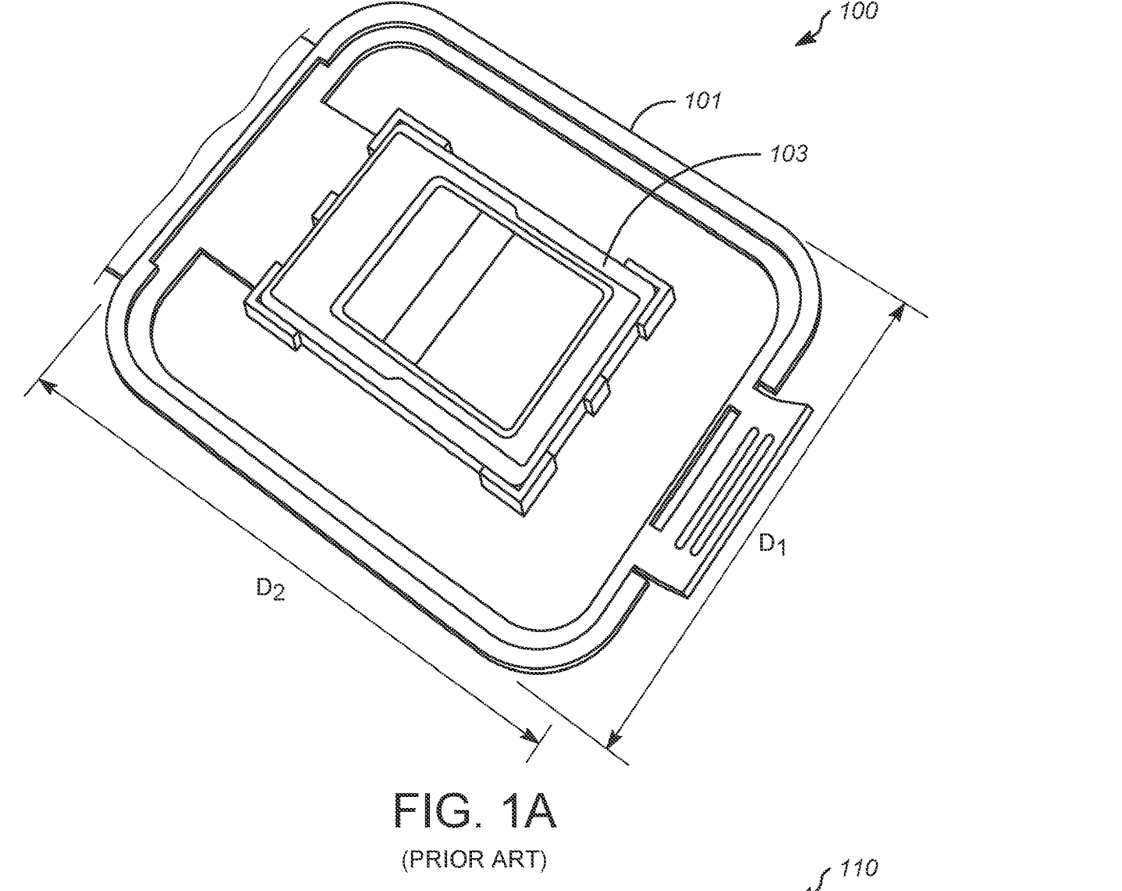
FIG. 1A shows a combination memory card and memory-card holder 100 of the prior art.

Referring now to FIG. 1A, a combination memory card and memory-card holder 100 of the prior art is shown. The memory card holder 100 consists of a non-biodegradable tray, a jewel-case 101, in which a memory card 103 can be placed. The jewel case 101 has an overall width, $D_1$. Once a cover portion (not shown explicitly) is folded over the memory card 103, an overall length, $D_2$, of the jewel case 101 is shown.

The jewel case 101 is frequently formed from various types of plastics known in the art, including semi-rigid or flexible forms, either of which may be transparent or translucent. The jewel case 101 is also frequently referred to as a "jewel box," but is always formed from various types of plastics. The various types of plastic can include, for example, polystyrene and related thermoplastics, polyethylene terephthalate (PET), polyvinylidene chloride (PVDC), cyclic olefin polymers (COP), or polyethylene (e.g., polyethylene terephthalate (PETG) or high-density polyethylene (HDPE)). Consequently, once a consumer receives and removes the memory card 103 for the jewel case 101, the jewel case 101 is frequently discarded.

Figure 1B:
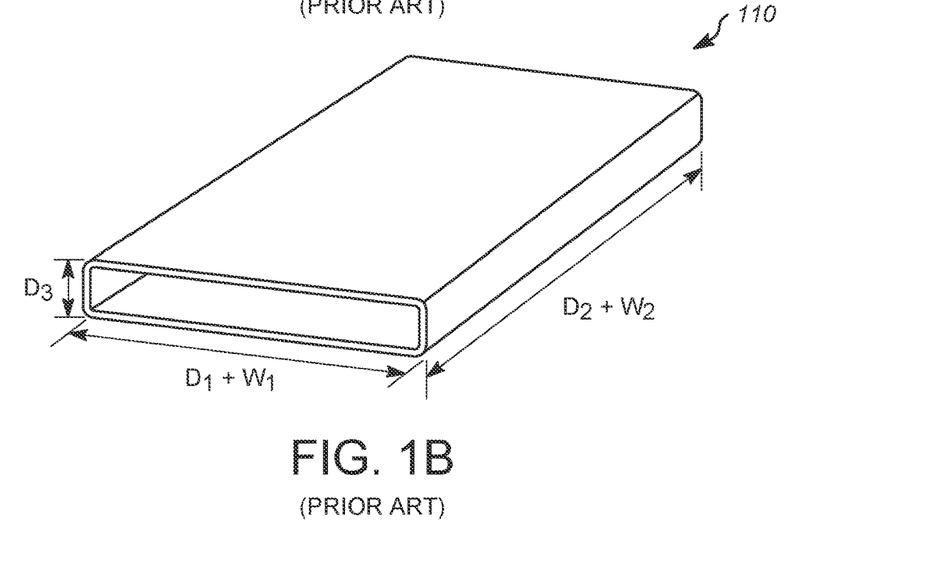
FIG. 1B shows a sleeve for the memory-card holder of FIG. 1A.

FIG. 1B shows a sleeve 110 for the jewel case 101 of FIG. 1A. The sleeve 110 may be formed from light cardstock (e.g., paper). The sleeve 110 has a width, $D_1+W_1$, and a length, $D_2+W_2$, where $W_1$ and $W_2$ are dimensions chosen so as to hold the jewel case 101 securely in place, while providing sufficient clearance to insert the memory card holder readily. Consequently, the dimensions for $w_1$ and $w_2$ may be chosen to be, for example, approximately 1 mm to 2 mm.

As noted above, once a consumer opens the packaging in which the memory card 103 is shipped, the consumer will frequently dispose of the memory card package (e.g., the jewel case 101) since the package is seldom recyclable due, at least, to its small size or a material from which the package is formed. Consequently, a material used to form a memory card holder that is bio-degradable is desirable and is not currently available from any memory card manufacturer or supplier.

The information described in this section is provided to offer the skilled artisan a context for the following disclosed subject matter and should not be considered as admitted prior art.

SUMMARY

This document describes, among other things, a biodegradable type of packaging for a digital data-storage memory card.

In various embodiments, the disclosed subject matter is a memory-card holder including a one-piece, unitary tray formed entirely from a bio-degradable material. The one-piece, unitary tray has a cover portion and a bottom portion formed into the bio-degradable material. At least one of the cover portion and the bottom portion has an indentation formed therein to accept a digital memory-card. The one-piece, unitary tray further includes a protrusion area on at least three sides projecting outward from and substantially parallel to the cover portion and the bottom portion. A hinge is integrally formed into the one-piece, unitary tray and between the cover portion and the bottom portion. The hinge is arranged to allow the cover portion to fold over the bottom portion of the one-piece, unitary tray. A closure tab and an insertion slot are formed on distal, opposing ends of the one-piece, unitary tray and arranged to latch the cover portion and the bottom portion to one another.

In various embodiments, the disclosed subject matter is a memory-card holder that includes a one-piece, unitary tray formed entirely from a bio-degradable material. The one-piece, unitary tray has a cover portion and a bottom portion formed into the bio-degradable material of the one-piece, unitary tray. At least one of the cover portion and the bottom portion has an indentation formed therein to accept a digital memory-card. A hinge is integrally formed into the one-piece, unitary tray and between the cover portion and the bottom portion. The hinge is arranged to allow the cover portion to fold over the bottom portion of the one-piece, unitary tray.

BRIEF DESCRIPTION OF THE DRAWINGS

In the drawings, which are not necessarily drawn to scale, like numerals describe substantially-similar components throughout the several views. Like numerals having different letter suffixes represent different instances of substantially-similar or related components. The drawings illustrate generally, by way of example, but not by way of limitation, various embodiments discussed in the present document.

DETAILED DESCRIPTION

The description that follows includes illustrative examples, devices, and apparatuses that embody various aspects of the disclosed subject matter. In the following description, for purposes of explanation, numerous specific details are set forth in order to provide an understanding of various embodiments of the inventive subject matter. It will be evident however, to those of ordinary skill in the art, that various embodiments of the disclosed subject matter may be practiced without these specific details. Further, well-known structures, materials, and techniques have not been shown in detail, so as not to obscure the various illustrated embodiments. As used herein, the terms "about," "approximately," or "substantially" may refer to values that are, for example, within ±10% of a given value or range of values.

Reference will now be made in detail to certain embodiments of the disclosed subject matter, examples of which are illustrated in part in the accompanying drawings. Other embodiments may incorporate structural, logical, electrical, process, and other changes. Portions and features of some embodiments may be included in, or substituted for, those of other embodiments. While the disclosed subject matter will be described in conjunction with the enumerated claims, it will be understood that the disclosed subject matter is not intended to limit the claims to the disclosed subject matter.

In various embodiments, the disclosed subject matter relates to a container used for the storage and shipping of digital memory-cards. Such digital memory-cards are used in the storage of data in cinema, video, and photography fields, as well as data storage in related fields. Such digital memory-cards are referred to herein as image-based, digital memory-cards (although such cards can also be used for the storage of textual and other data as well). The data storage usage can include any environment in which large volumes (e.g., 1 TB or more) of data files are stored on the memory cards, such as, for example, but not limited to, secure digital cards (SD) and various types of CompactFlash cards including XQD®, CFEXPRESS®, and CFAST® cards.

Figure 2A:
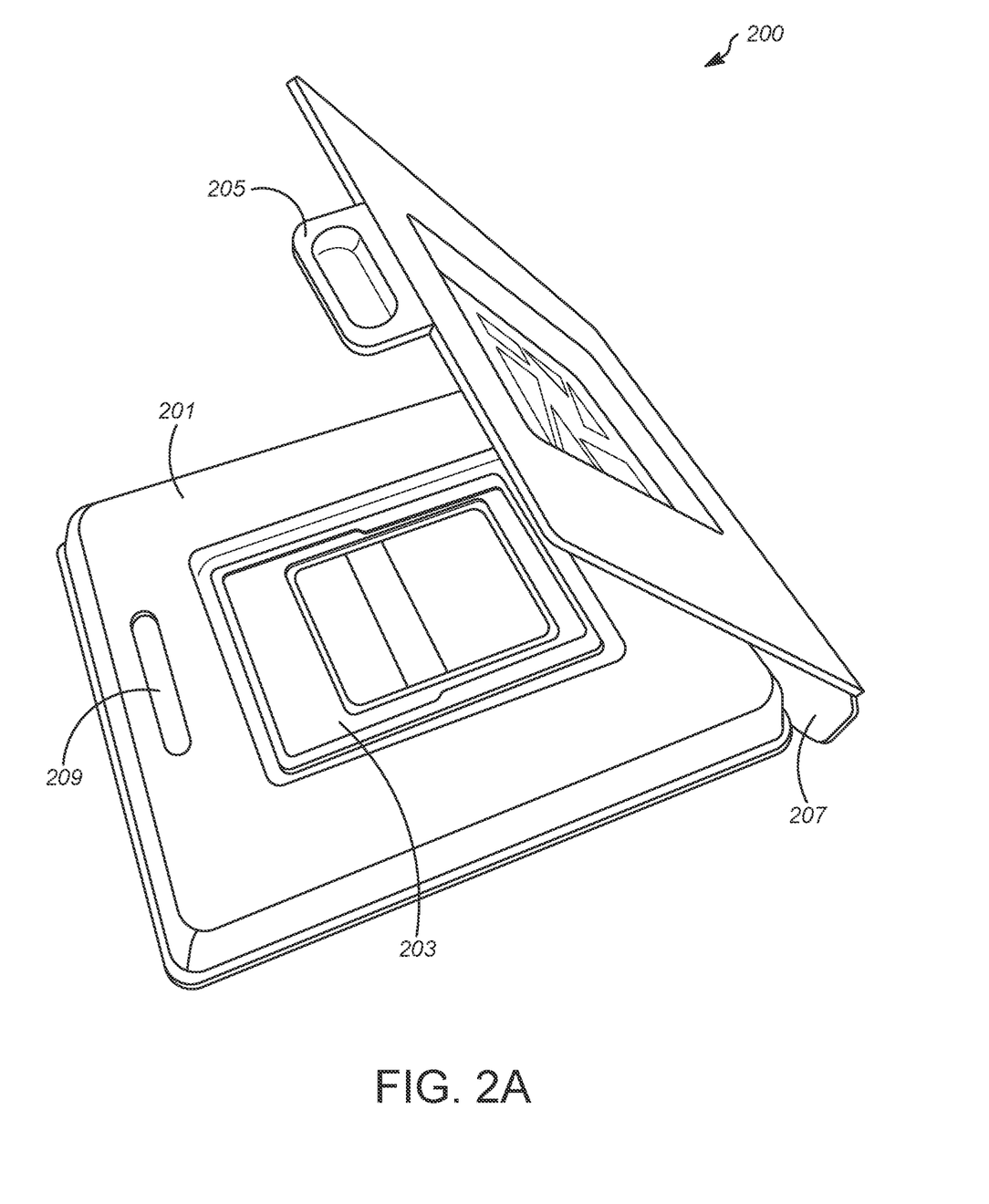
FIG. 2A shows a perspective view of an exemplary memory-card holder in a partially open position, with a memory card inserted, in accordance with various embodiments of the disclosed subject matter.

FIG. 2A shows a perspective view 200 of an exemplary version of a memory-card holder 201 in a partially open position, with a memory card 203 inserted, in accordance with various embodiments of the disclosed subject matter. The memory-card holder 201 is shown to include a hinge portion 207, a closure tab 205, and an insertion slot 209 into which the closure tab 205 is inserted to keep the upper portion (the cover portion) and the lower portion (the card-holder portion) of the memory-card holder 201 together in a re-couplable manner. Once the closure tab 205 is inserted into the insertion slot 209 with the memory card 203 enclosed within the memory-card holder 201, the coupled closure tab 205 and the insertion slot 209 ensures that the memory card 203 can be carried and/or transported (e.g., to on-location shooting destinations or shipped via postal services or a common carrier) without damage to the memory card 203 through normal handling.

The hinge portion 207 serves to physically couple the upper portion of the memory-card holder 201 to the lower portion of the memory-card holder 201. The memory-card holder 201 is formed from a bio-degradable material, described in more detail, below. Moreover, the memory-card holder 201 is formed from the bio-degradable material as a single, integral unit (e.g., a unitary or one-piece design structure, a single entity). Upon reading and understanding the disclosed subject matter, a person of ordinary skill in the art will recognize that the terms "bio-degradable material" refer to a material capable of being decomposed by bacteria or other living organisms, in a relatively short period of time (e.g., days, weeks, or months and not multiple years or decades as noted with regard to plastic materials, described above). The terms "bio-degradable material" are described in even more detail below.

For example, in various embodiments, the memory-card holder 201 can be constructed from a variety of materials including, for example, various types of molded fiber, molded pulp material, or molded paper. For example, the memory-card holder 201 may comprise 100% post-consumer molded fiber or molded pulp-feedstock such as type-2 molded fiber, type-2A thermoformed fiber, type-3 thermoformed fiber, type-4 thermoformed fiber, molded fiber, x-ray-formed fiber, infrared-formed fiber, microwave-formed fiber, vacuum-formed fiber, structural fiber. The terms pulp or pulp-feedstock may also apply to any of the materials (e.g., fiber molding, natural fibers, biodegradable material, or compostable materials) that may be used to form the memory-card holder 201.

In various embodiments, the memory-card holder 201 can be formed from one or more sheets of bio-degradable materials that are bonded together by being laminated, folded, or glued together. The sheets of material can comprise hinges, joints, creases, interlocks, flanges, or flaps that are molded or otherwise formed composites of biodegradable materials, described herein. Therefore, the memory-card holder 201 may comprise 100% post-consumer fiber, pulp, or one or more other types of biodegradable material or compostable material.

Further, the terms bio-degradable material describe a material that will decompose naturally. In other words, the memory-card holder 201 may comprise materials that will decay relatively quickly (e.g., in comparison with plastics, as described above) as a result of the action of bacteria and break down into elements such as carbon that are recycled naturally. Therefore, the memory-card holder 201 is capable of being broken down and naturally absorbed into the ecosystem. As is known to a person of ordinary skill in the art, bio-degradable materials degrade into simple stable compounds that are not harmful to the environment. The memory-card holder 201 may therefore be recyclable, renewable, made of renewable materials, made from renewable materials, or various combination thereof.

In various embodiments, the memory-card holder 201 may also comprise plant material, such as, for example, woody material, herbaceous material, or product-recovery material (e.g., fibrous material) and the like. Examples of wood material include, but are not limited to, lumber waste, wood-processing waste, thinned wood, and forest-remainder material include, for example, pruned branches, core, bark, leaves, roots, and/or fruits. The herbaceous raw materials include, for example, bamboo, bagasse, rice hulls, rice straw, wheat straw, grass, bamboo grass, pampas grass, reeds, and stems.

Figure 2B:
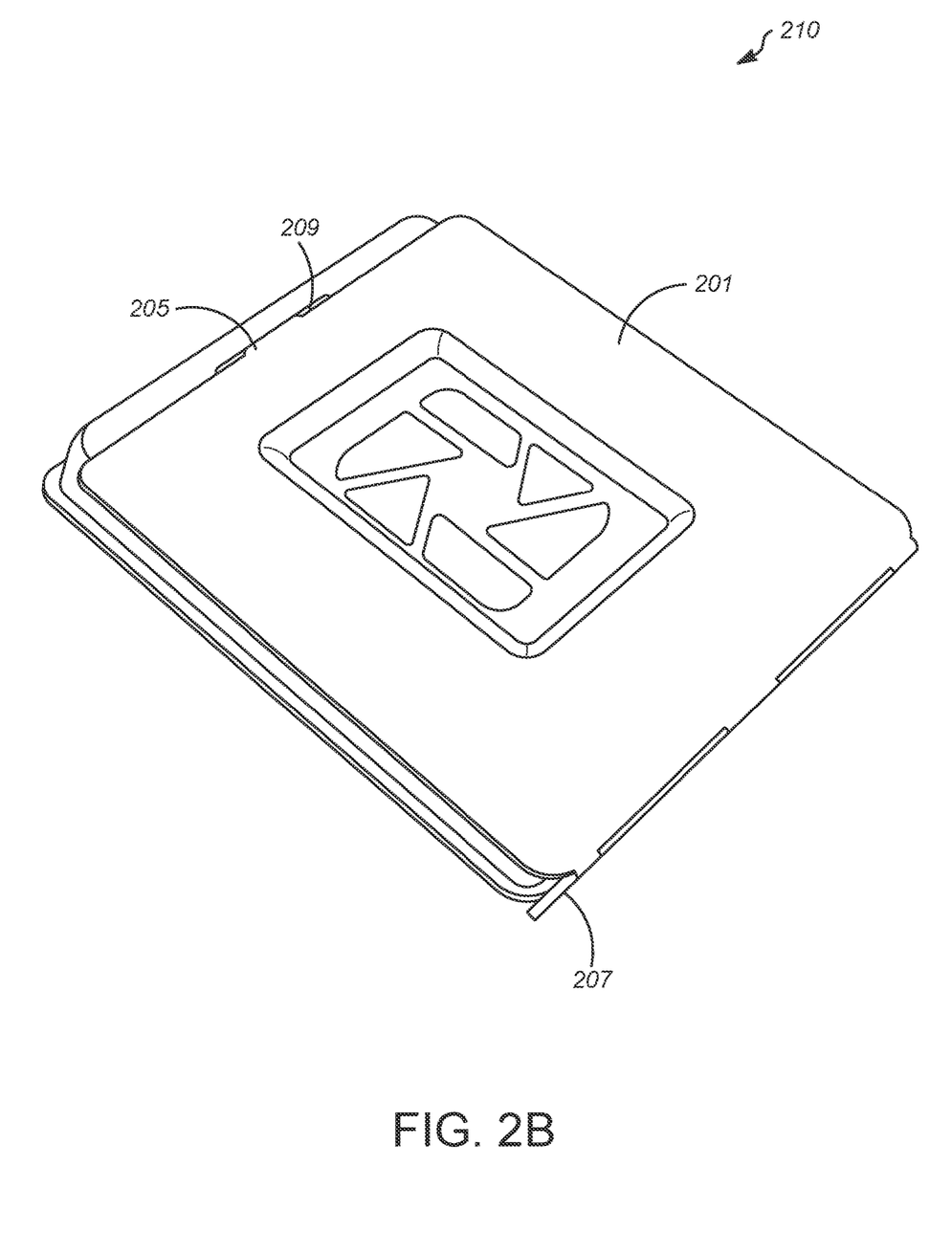
FIG. 2B shows a perspective view of the exemplary memory-card holder of FIG. 2A, in a closed position.

FIG. 2B shows a perspective view 210 of the exemplary version of the memory-card holder 201 of FIG. 2A, in a closed position. The skilled artisan will recognize the interoperability of components of the memory-card holder 201, including how the hinge portion 207 allows the upper portion and the lower portion of the memory-card holder 201 to come together. FIG. 2B also indicates how the closure tab 205 can be inserted into the insertion slot 209 such that the upper portion and the lower portion of the memory-card holder 201 may be affixed to each other in a re-couplable manner.

Figure 2C:
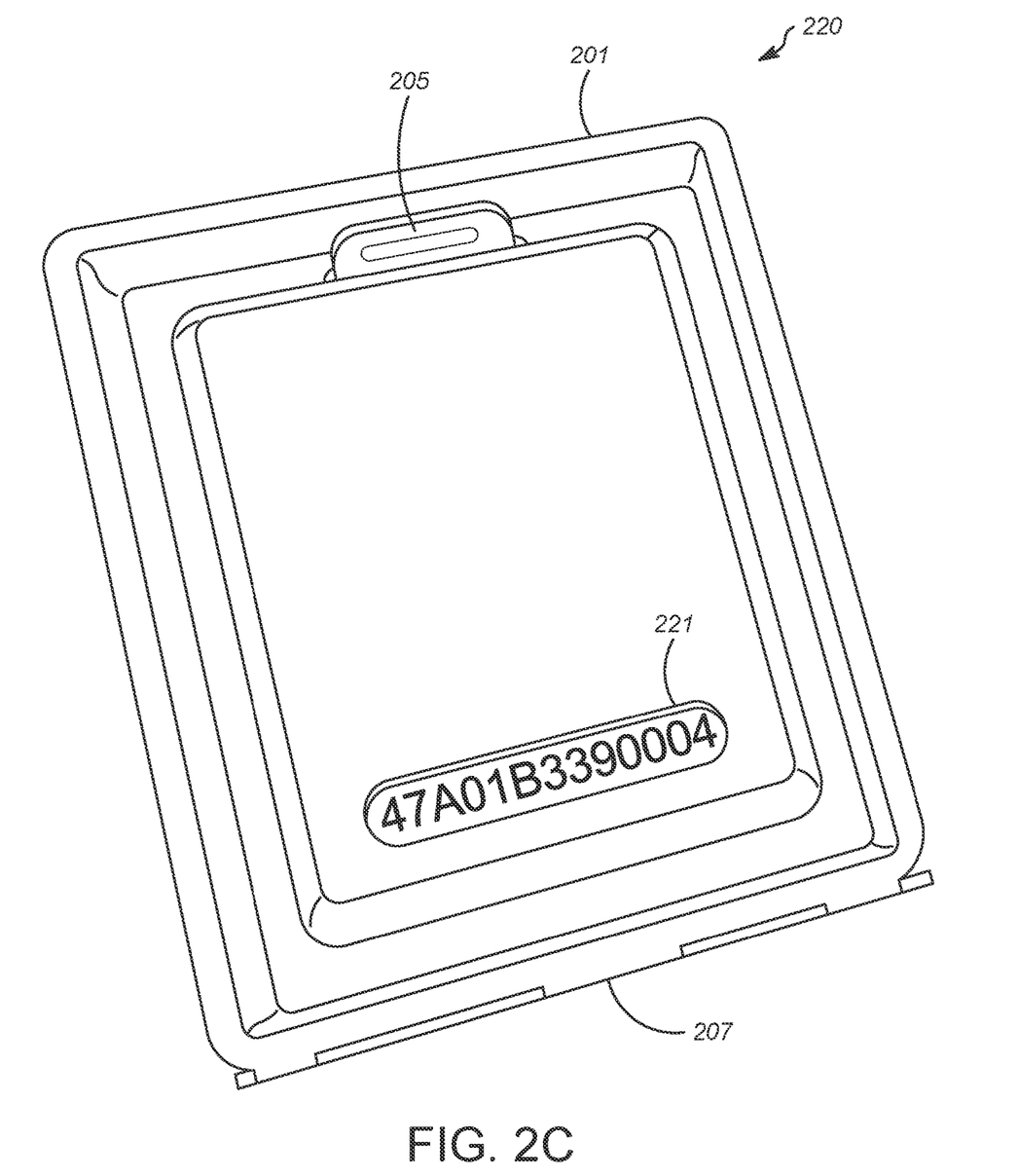
FIGS. 2C and 2D show perspective backside views of the exemplary memory-card holder of FIG. 2A, and including incorporated slots through which alpha-numeric characters of an enclosed memory card may be viewed.
Figure 2D:
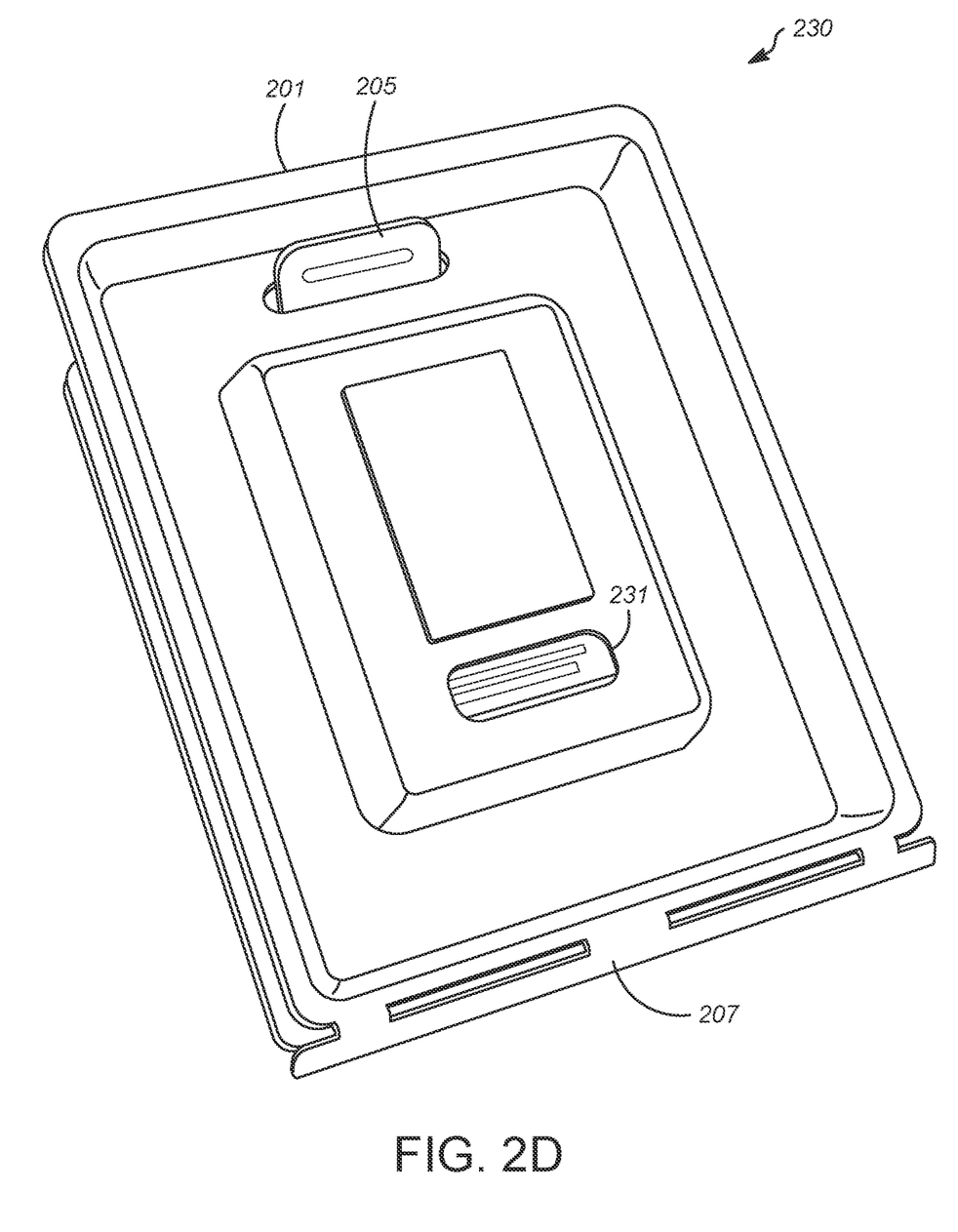

FIGS. 2C and 2D show perspective backside-views 220, 230 of the exemplary memory-card holder 201 of FIG. 2A, and including slots 221, 231 through which alpha-numeric characters of an enclosed memory card may be viewed. FIGS. 2C and 2D further indicate how the closure tab 205 can be inserted into the insertion slot 209 such that the upper portion and the lower portion of the memory-card holder 201 may be affixed to each other in a re-couplable manner. As shown in the respective drawings, each of FIG. 2C and FIG. 2D are configured to hold different sizes of memory cards. The memory-card holder 201 of FIG. 2C is configured to hold a memory card of a larger size than the memory-card holder 201 of FIG. 2D. However, the respective slots 221, 231 of the perspective backside-view 220 of FIG. 2C and the perspective backside-view 230 of FIG. 2D can each be placed and sized accordingly to align with a serial number placed upon memory cards by manufacturers of such cards with the respective sizes of the memory-card holder 201. Various sizes of typical memory cards are described below with reference to Table I and FIGS. 3A and 3B.

Figure 2E:
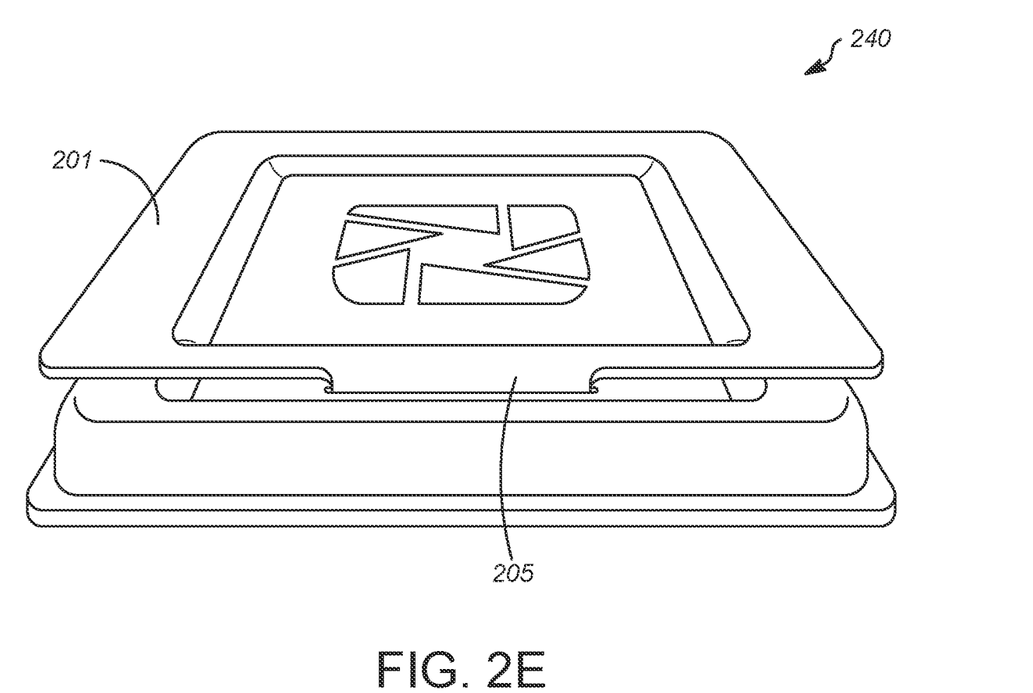
FIG. 2E shows another perspective view of the exemplary memory-card holder of FIG. 2A, in a closed position.
Figure 2F:
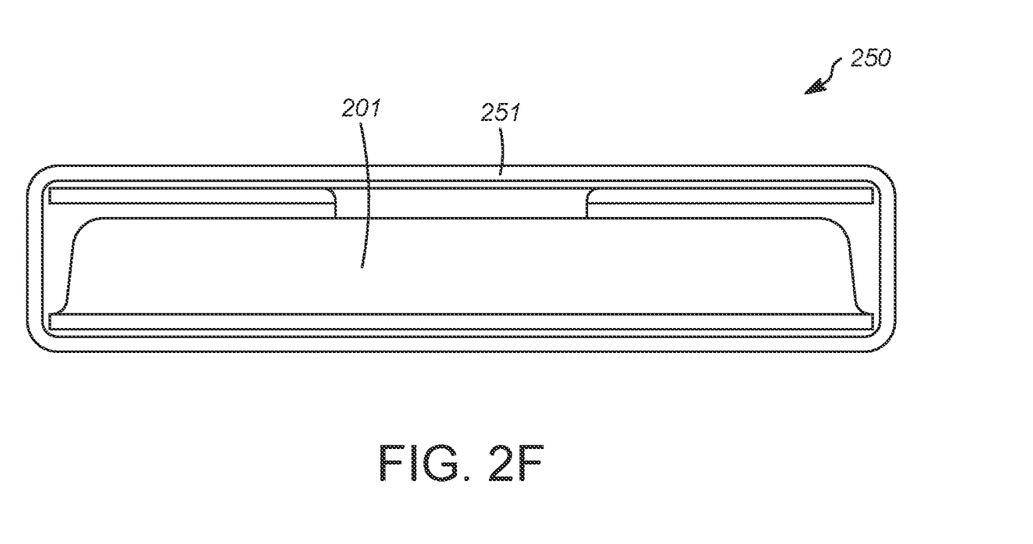
FIG. 2F shows an elevational view of the exemplary memory-card holder of FIG. 2E inserted into a sleeve.

FIG. 2E shows another perspective view 240 of the exemplary memory-card holder 201 of FIG. 2A, in a closed position. FIG. 2F shows an elevational view 250 of the exemplary memory-card holder 201 of FIG. 2E inserted into a sleeve 251. The sleeve 251 may be the same as or similar to the sleeve 110 of FIG. 1B. However, the sleeve 251 is formed from a bio-degradable material as described above. The sleeve 110 of the prior art may or may not comprise a bio-degradable material.

Figure 3A:
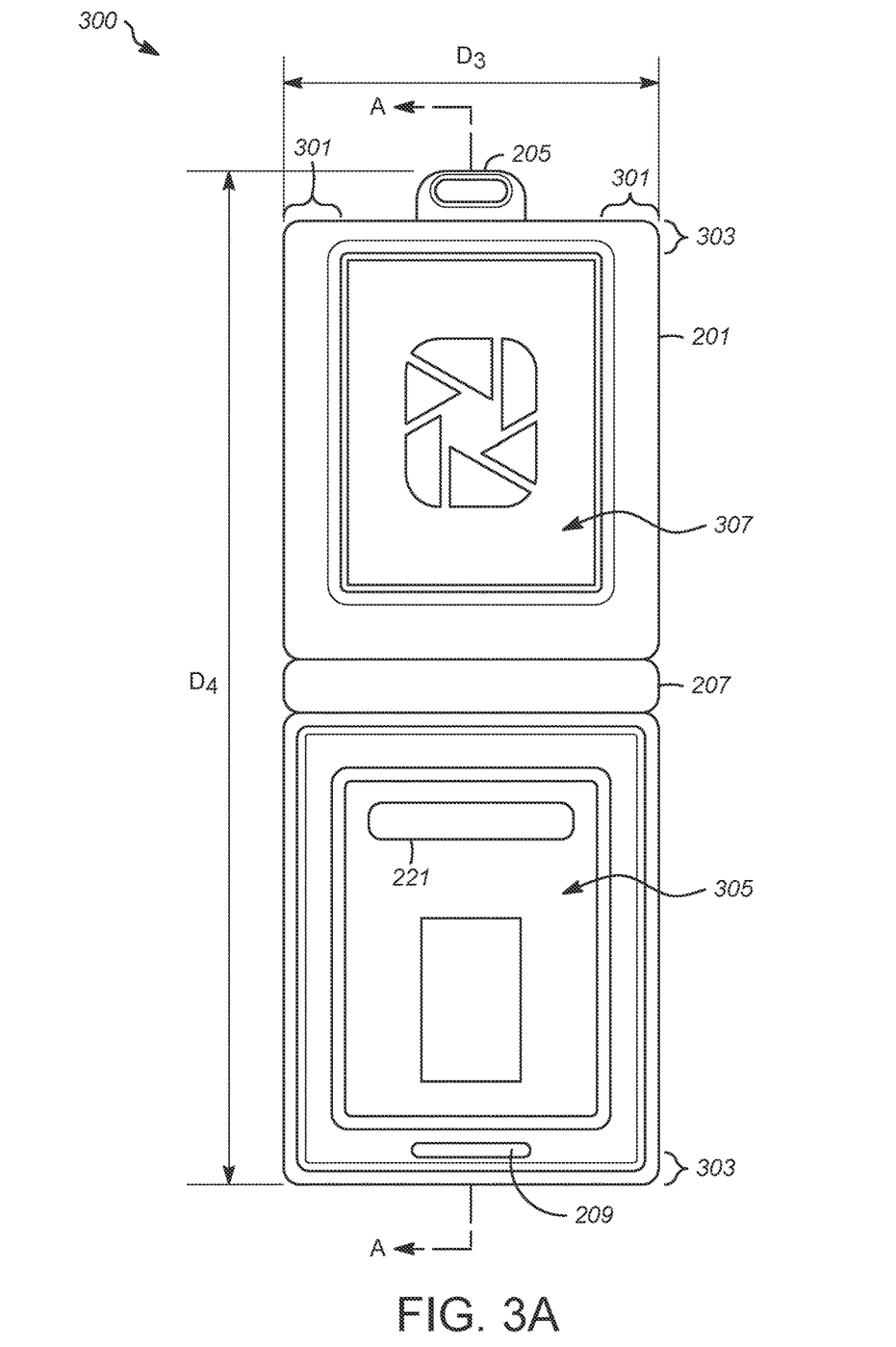
FIG. 3A shows a plan view of an exemplary memory-card holder, in accordance with various embodiments of the disclosed subject matter.

FIG. 3A shows a plan view 300 of an exemplary version of the memory-card holder 201, in accordance with various embodiments of the disclosed subject matter. The memory-card holder 201 of FIG. 3A is shown to include a bottom-tray indentation 305 and a top-tray indentation 307. Although both the bottom-tray indentation 305 and the top-tray indentation 307 are indicated as being "indentations" of the memory-card holder 201, in embodiments one or both of the bottom-tray indentation 305 and the top-tray indentation 307 the actual indentation may protrude towards an outside portion (e.g., away from the memory card) or protrude towards an inside portion of the memory-card holder 201. In embodiments, at least one of the bottom-tray indentation 305 and the top-tray indentation 307 may consist of a "flat" portion that is substantially co-planar with a respective portion of the upper portion of the memory-card holder 201 or the lower portion of the memory-card holder 201. The term "indentation" is therefore relative and simply used to describe possible configurations of the memory-card holder 201.

The memory-card holder 201 of FIG. 3A is also shown to include edge protrusions 301 and an end protrusion 303. The edge protrusions 301 and the end protrusion 303 are provided to substantially center the memory-card holder 201 within the sleeve 251 of FIG. 2F. Further, the edge protrusions 301 and the end protrusion 303 help stabilize the memory-card holder 201 and thereby provide structure to the combination of the memory-card holder 201 and the sleeve 251. The added structure can assist in preventing a crushing to the combination of the memory-card holder 201 and the sleeve 251 during, for example, shipment of the memory card, or should a reseller of the combination of the memory-card holder 201 and the sleeve 251 employ shipping schemes such as a vacuum seal or shrink-wrap technology. Additionally, although not shown explicitly, the end protrusion 303 may also be included near an area proximal to the hinge portion 207. There is no requirement that the edge protrusions 301 and one or more of the end protrusions 303 need to be symmetrical with each other or relative to an adjoining protrusion.

Figure 3B:
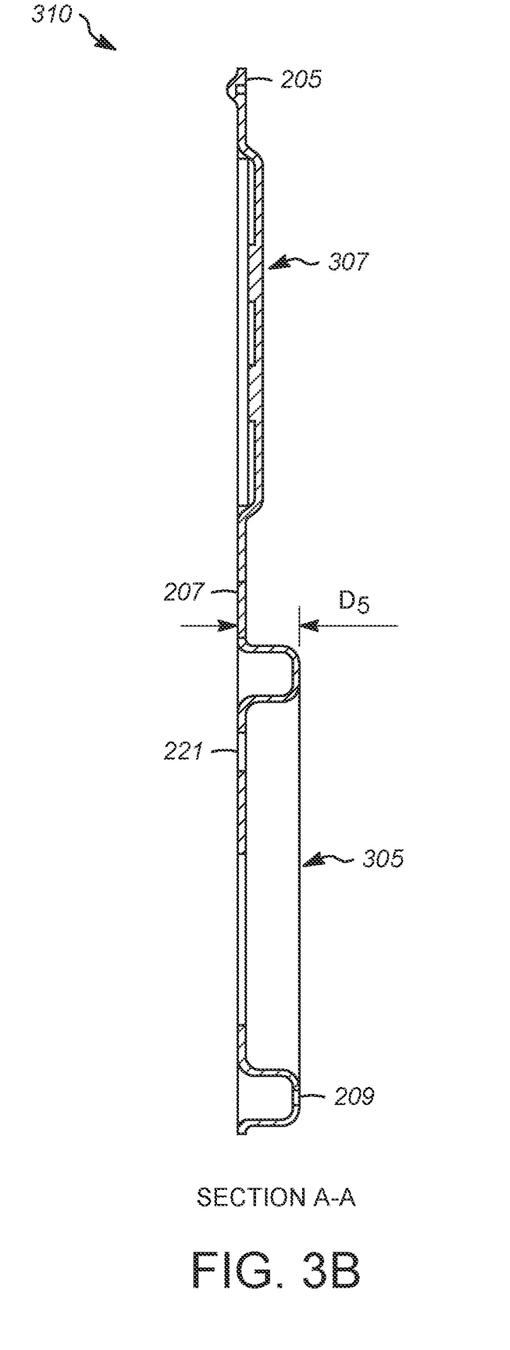
FIG. 3B shows a cross-sectional view of the exemplary memory-card holder of FIG. 3A.

With concurrent reference now to FIG. 3A, FIG. 3B shows a cross-sectional view of the exemplary memory-card holder 201 of FIG. 3A. At least one of the bottom-tray indentation 305 and the top-tray indentation 307 is configured to hold a memory card. Further, the remaining one of the bottom-tray indentation 305 and the top-tray indentation 307 that does not hold the memory card is configured to apply pressure to the memory card when the memory-card holder 201 is folded.

In embodiments, each of the dimensions shown in FIG. 3A may be considered relative to a size of the memory card 203 to be inserted with the memory-card holder 201. In other embodiments, each of the dimensions may be sized consistently regardless of a size of the memory card inserted within the memory-card holder 201. Such an arrangement would allow the dimensions of the sleeve to be consistent regardless of the memory card contained within the memory-card holder 201. In still other embodiments, the length, $D_4$, and the width, $D_3$, of the memory-card holder 201 may be sized consistently regardless of a size of the memory card inserted within the memory-card holder 201. However, the depth, $D_5$, of the memory-card holder 201 may be changed depending on a thickness of a memory card holder contained therein.

For example, Table I, below, shows industry-standard size of a few types of memory cards. These sizes are provided as examples only; other card types and form factors either exist or are contemplated. Regardless, various embodiments of the disclosed subject matter can be sized accordingly to accommodate the various card dimensions.

TABLE I

| CARD TYPE | NOMINAL DIMENSIONS (LENGTH × WIDTH × THICKNESS [mm]) |
| --- | --- |
| Secure Digital (SD) | 32.0 × 24.0 × 2.1 |
| microSD | 15.0 × 11.0 × 1.0 |
| CompactFlash ® (CFEXPRESS ®) | 38.5 × 29.6 × 3.8 |
| CFAST ® | 42.8 × 36.4 × 3.3 |

In embodiments where the memory-card holder 201 is sized consistently regardless of a size of the memory card inserted within the memory-card holder 201, the length, $D_4$, of the memory-card holder 201 may be about 112 mm to about 114 mm long. The width, $D_3$, may be about 40 mm to about 42 mm wide. The thickness, $D_5$, may be about 6.3 mm to about 6.5 mm thick. However, each of the dimensions shown are examples only and other dimensions may readily be contemplated and are therefore within a scope of the disclosed subject matter.

In one specific exemplary embodiment, using a CompactFlash® memory card, having length and width dimensions of 38.5 mm and 29.6 mm, respectively, and dimensions of the memory-card holder 201 are 42 mm wide and 112 mm long, the edge protrusions 301 would be about 6.2 mm wide (assuming each of the edge protrusions 301 are of about equal size in this example). Assuming two equally-sized ones of the end protrusions 303 on each end of the memory-card holder 201, each of the end protrusion 303 would be about 8.75 wide. These dimensions are provided as examples only to more fully illustrate possible dimensions of the disclosed subject matter.

Figure 3C:
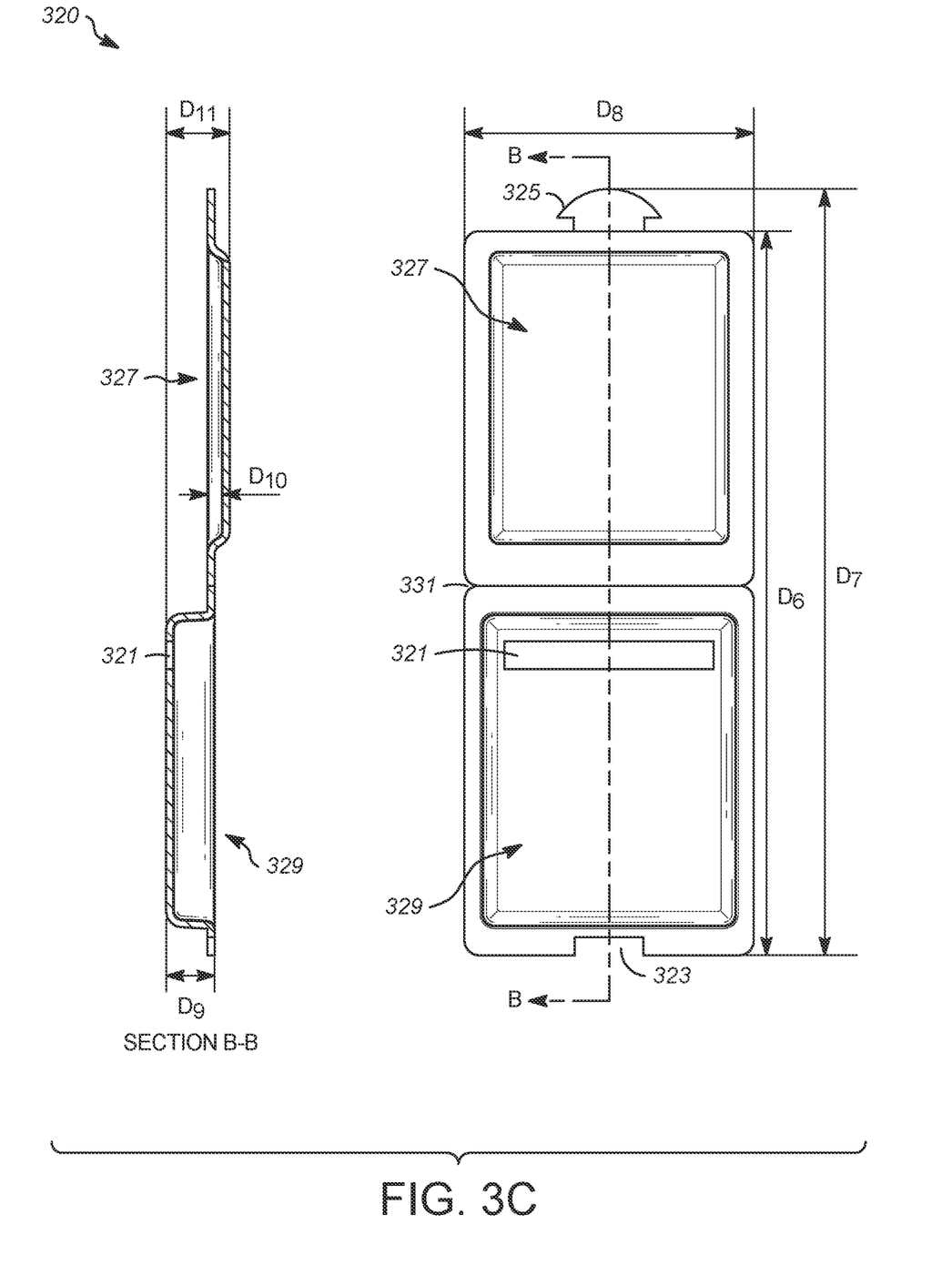
FIG. 3C shows a plan view and a cross-sectional view of an exemplary memory-card holder, in accordance with various embodiments of the disclosed subject matter.

FIG. 3C shows a plan view and a cross-sectional view of an exemplary memory-card holder 320, in accordance with various embodiments of the disclosed subject matter. The memory-card holder 320 of FIG. 3C is shown to include a bottom-tray indentation 329, a top-tray indentation 327, and a slot 321 through which alpha-numeric characters of an enclosed memory card may be viewed. In this example, the top-tray indentation 327 is configured to hold a memory card (not shown) by slightly protruding into the bottom-tray indentation 329 when the memory-card holder 320 is in a folded position. Although both the bottom-tray indentation 329 and the top-tray indentation 327 are indicated as being "indentations" of the memory-card holder 320, in embodiments, one or both of the bottom-tray indentation 329 and the top-tray indentation 327 the actual indentation may protrude towards an outside portion (e.g., away from the memory card) or protrude towards an inside portion of the memory-card holder 320. In embodiments, at least one of the bottom-tray indentation 329 and the top-tray indentation 327 may consist of a "flat" portion that is substantially co-planar with a respective portion of an upper portion of the memory-card holder 320 or a lower portion of the memory-card holder 320. The term "indentation" is therefore relative and simply used to describe possible configurations of the memory-card holder 320 of FIG. 3C.

With continuing reference to FIG. 3C, the memory-card holder is shown further to include a hinge portion 331, a closure tab 325, and an open insertion-area 323 into which the closure tab 325 is placed (or folded into) to keep the upper portion (the cover portion) and the lower portion (the card-holder portion) of the memory-card holder 320 together in a re-couplable manner. The hinge portion 331 serves to physically couple the upper portion of the memory-card holder 320 to the lower portion of the memory-card holder 320 when the memory-card holder is folded (e.g., with a memory card being inserted therein). At least one of the bottom-tray indentation 329 and the top-tray indentation 327 is configured to hold a memory card. Further, the remaining one of the bottom-tray indentation 329 and the top-tray indentation 327 that does not hold the memory card is configured to apply pressure to the memory card when the memory-card holder 320 is folded.

Each of the various portions of the memory-card holder 320 may be the same as or similar to the memory-card holder 201 of FIGS. 2A through 3B. Significantly, the memory-card holder 320 is formed completely from a bio-degradable material as described herein.

In one specific exemplary embodiment, using a CFAST® memory card, having length and width dimensions of 42.8 mm and 36.4 mm, respectively, a width, $D_8$, of the memory-card holder 320 is about 42 mm wide and an overall length, $D_7$ is about 110 mm long. A length, De, of the memory-card holder 320, excluding the closure tab 325, is about 104 mm. An overall thickness, $D_9$, of the memory-card holder 320 proximal to the bottom-tray indentation 329 is about 6 mm, while a depth, $D_{10}$, of the top-tray indentation 327 of the memory-card holder 320 is about 2 mm. An overall thickness, $D_{11}$, of the memory-card holder 320 in an unfolded state is about 9 mm. These dimensions are provided as examples only to more fully illustrate possible dimensions of the disclosed subject matter. However, each of the dimensions shown are examples only and other dimensions may readily be contemplated and are therefore within a scope of the disclosed subject matter.

Figure 4A:
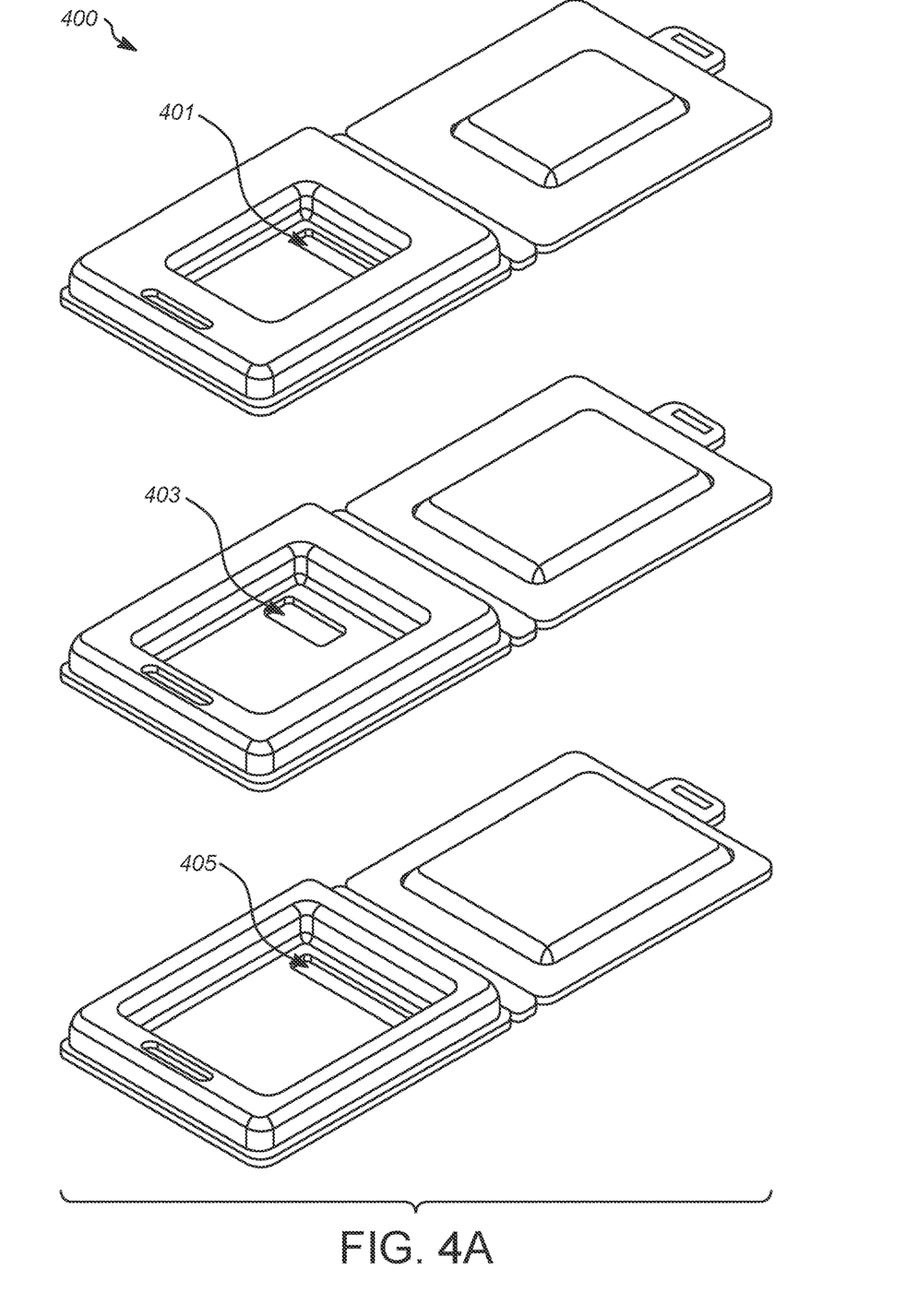
FIG. 4A shows perspective views of various exemplary memory-card holders suitable for different memory card sizes and types as shown in FIGS. 3A and 3B, in accordance with various embodiments of the disclosed subject matter.

FIG. 4A shows perspective views of various exemplary memory-card holders suitable for different memory card sizes and types as shown in FIGS. 3A and 3B, in accordance with various embodiments of the disclosed subject matter. A person of ordinary skill in the art will recognize that each of the memory-card holders shown in the examples of FIG. 4A is sized to accommodate a different type of memory card, even though the outer dimensions of each card holder may be approximately the same size.

Each of the perspective views 400 of FIG. 4A is shown to include a memory-card identification slot 401, 403, 405. The memory-card identification slots 401, 403, 405 are sized and placed in a location such that the identification number (e.g., a serial number) may be viewed from an outside of a combination of the memory card and the memory-card holder combination.

Figure 4B:
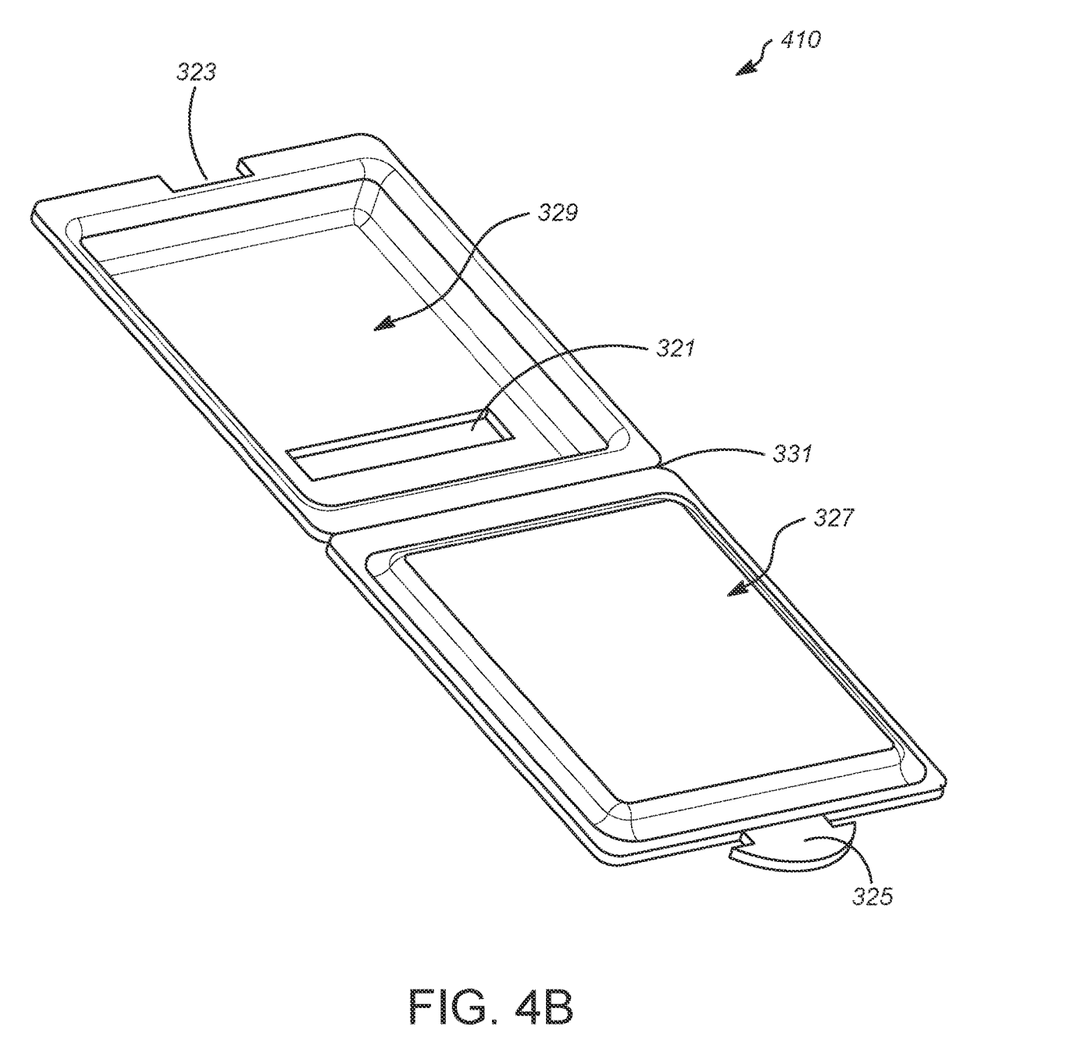
FIG. 4B shows a perspective view of an exemplary memory-card holders, suitable for different memory card sizes and types as shown in FIG. 3C, in accordance with various embodiments of the disclosed subject matter.

FIG. 4B shows a perspective view of an exemplary memory-card holder 410, suitable for a memory card size and type as shown in FIG. 3C, in accordance with various embodiments of the disclosed subject matter.

Based upon reading and understanding the disclosure provided herein, a person of ordinary skill in the art will recognize a number of other configurations of memory-card holders described herein are possible. Each of the other possible configuration are within a scope of the appended claims. Therefore, the description above includes illustrative examples, devices, and apparatuses, as well as possible materials, that embody the disclosed subject matter. In the description, for purposes of explanation, numerous specific details were set forth in order to provide an understanding of various embodiments of the disclosed subject matter. It will be evident, however, to those of ordinary skill in the art that various embodiments of the subject matter may be practiced without these specific details. Further, well-known structures, materials, and techniques have not been shown in detail, so as not to obscure the various illustrated embodiments.

As used herein, the term "or" may be construed in an inclusive or exclusive sense. Further, other embodiments will be understood by a person of ordinary skill in the art upon reading and understanding the disclosure provided. Moreover, upon reading and understanding the disclosure provided herein, the person of ordinary skill in the art will readily understand that various combinations of the techniques and examples provided herein may all be applied in various combinations.

Although various embodiments are discussed separately, these separate embodiments are not intended to be considered as independent techniques or designs. As indicated above, each of the various portions may be inter-related and each may be used separately or in various combinations.

Consequently, many modifications and variations can be made, as will be apparent to the person of ordinary skill in the art upon reading and understanding the disclosure provided herein. Functionally equivalent methods and devices within the scope of the disclosure, in addition to those enumerated herein, will be apparent to a skilled artisan from the foregoing descriptions. Portions and features of some embodiments may be included in, or substituted for, those of others. Such modifications and variations are intended to fall within a scope of the appended claims. Therefore, the present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to quickly ascertain the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

THE FOLLOWING NUMBERED EXAMPLES ARE SPECIFIC EMBODIMENTS OF THE DISCLOSED SUBJECT MATTER

Example 1. A memory-card holder including a one-piece, unitary tray formed entirely from a bio-degradable material. The one-piece, unitary tray has a cover portion and a bottom portion formed into the bio-degradable material. At least one of the cover portion and the bottom portion has an indentation formed therein to accept a digital memory-card. The one-piece, unitary tray further includes a protrusion area on at least three sides projecting outward from and substantially parallel to the cover portion and the bottom portion. A hinge is integrally formed into the one-piece, unitary tray and between the cover portion and the bottom portion. The hinge is arranged to allow the cover portion to fold over the bottom portion of the one-piece, unitary tray. A closure tab and an insertion slot are formed on distal, opposing ends of the one-piece, unitary tray and arranged to latch the cover portion and the bottom portion to one another.

Example 2. The memory-card holder of Example 1, wherein at least one of the cover portion and the bottom portion having the indentation is configured to hold the digital memory-card.

Example 3. The memory-card holder of Example 2, wherein a remaining one of the cover portion and the bottom portion is that does not hold the digital memory-card is configured to apply pressure to the digital memory-card.

Example 4. The memory-card holder of any one of the preceding Examples, further comprising a slot formed within the bottom portion of the one-piece, unitary tray through which an identification number of the digital memory-card may be read.

Example 5. The memory-card holder of any one of the preceding Examples, further comprising a sleeve, formed entirely from a bio-degradable material, into which the memory-card holder may be inserted.

Example 6. The memory-card holder of Example 5, wherein the protrusion area is configured to provide structure to the memory-card holder to prevent collapse of the one-piece, unitary tray during shipment when the one-piece, unitary tray is inserted into the sleeve.

Example 7. The memory-card holder of Example 5, wherein the sleeve is formed from the same bio-degradable material as the one-piece, unitary tray formed.

Example 8. The memory-card holder of Example 5, wherein the sleeve is formed from a different bio-degradable material than the material used to form the one-piece, unitary tray formed.

Example 9. The memory-card holder of any one of the preceding Examples, wherein the digital memory-card is an image-based, digital memory-card.

Example 10. The memory-card holder of any one of the preceding Examples, wherein the bio-degradable material includes at least one material selected from materials including molded fiber, molded pulp material, and molded paper.

Example 11. The memory-card holder of any one of the preceding Examples, wherein the bio-degradable material includes at least one material selected from materials including type-2 molded fiber, type-2A thermoformed fiber, type-3 thermoformed fiber, type-4 thermoformed fiber, molded fiber, x-ray-formed fiber, infrared-formed fiber, microwave-formed fiber, vacuum-formed fiber, and structural fiber.

Example 12. The memory-card holder of any one of the preceding Examples, wherein the bio-degradable material is a 100% post-consumer material and is formed from at least one of a woody material and a herbaceous material.

Example 13. The memory-card holder of any one of the preceding Examples, wherein the one-piece, unitary tray is formed from one or more sheets of bio-degradable materials that are bonded together by at least one bonding method selected from methods including being laminated, folded, and glued together.

Example 14. A memory-card holder that includes a one-piece, unitary tray formed entirely from a bio-degradable material. The one-piece, unitary tray has a cover portion and a bottom portion formed into the bio-degradable material of the one-piece, unitary tray. At least one of the cover portion and the bottom portion has an indentation formed therein to accept a digital memory-card. A hinge is integrally formed into the one-piece, unitary tray and between the cover portion and the bottom portion. The hinge is arranged to allow the cover portion to fold over the bottom portion of the one-piece, unitary tray.

Example 15. The memory-card holder of Example 14, further comprising a closure tab and an insertion slot formed on distal, opposing ends of the one-piece, unitary tray and configured to latch the cover portion and the bottom portion to one another.

Example 16. The memory-card holder of Example 14, further comprising a closure tab and an open insertion-area formed on distal, opposing ends of the one-piece, unitary tray and configured to latch the cover portion and the bottom portion to one another.

Example 17. The memory-card holder of any one of Example 14 through Example 16, further comprising a protrusion area on at least three sides projecting outward from and substantially parallel to the cover portion and the bottom portion.

Example 18. The memory-card holder of any one of Example 14 through Example 17, wherein at least one of the cover portion and the bottom portion having the indentation is configured to hold the digital memory-card.

Example 19. The memory-card holder of Example 18, wherein a remaining one of the cover portion and the bottom portion is that does not hold the digital memory-card is configured to apply pressure to the digital memory-card.

Example 20. The memory-card holder of any one of Example 14 through Example 19, further comprising a slot formed within the bottom portion of the one-piece, unitary tray through which an identification number of the digital memory-card may be read.

What is claimed is:

1. A memory-card holder, comprising:
   a one-piece, unitary tray formed entirely from a bio-degradable material, the one-piece, unitary tray including a cover portion and a bottom portion formed into the bio-degradable material, at least one of the cover portion and the bottom portion having an indentation formed therein to accept a digital memory-card, the one-piece, unitary tray further including a protrusion area on at least three sides projecting outward from and substantially parallel to the cover portion and the bottom portion;
   a hinge integrally formed into the one-piece, unitary tray and between the cover portion and the bottom portion, the hinge being configured to allow the cover portion to fold over the bottom portion of the one-piece, unitary tray; and
   a closure tab and an insertion slot formed on distal, opposing ends of the one-piece, unitary tray and configured to latch the cover portion and the bottom portion to one another.

2. The memory-card holder of claim 1, wherein at least one of the cover portion and the bottom portion having the indentation is configured to hold the digital memory-card.

3. The memory-card holder of claim 2, wherein a remaining one of the cover portion and the bottom portion is that does not hold the digital memory-card is configured to apply pressure to the digital memory-card.

4. The memory-card holder of claim 1, further comprising a slot formed within the bottom portion of the one-piece, unitary tray through which an identification number of the digital memory-card may be read.

5. The memory-card holder of claim 1, further comprising a sleeve, formed entirely from a bio-degradable material, into which the memory-card holder may be inserted.

6. The memory-card holder of claim 5, wherein the protrusion area is configured to provide structure to the memory-card holder to prevent collapse of the one-piece, unitary tray during shipment when the one-piece, unitary tray is inserted into the sleeve.

7. The memory-card holder of claim 5, wherein the sleeve is formed from the same bio-degradable material as the one-piece, unitary tray formed.

8. The memory-card holder of claim 5, wherein the sleeve is formed from a different bio-degradable material than the material used to form the one-piece, unitary tray formed.

9. The memory-card holder of claim 1, wherein the digital memory-card is an image-based, digital memory-card.

10. The memory-card holder of claim 1, wherein the bio-degradable material includes at least one material selected from materials including molded fiber, molded pulp material, and molded paper.

11. The memory-card holder of claim 1, wherein the bio-degradable material includes at least one material selected from materials including type-2 molded fiber, type-2A thermoformed fiber, type-3 thermoformed fiber, type-4 thermoformed fiber, molded fiber, x-ray-formed fiber, infra-red-formed fiber, microwave-formed fiber, vacuum-formed fiber, and structural fiber.

12. The memory-card holder of claim 1, wherein the bio-degradable material is a 100% post-consumer material and is formed from at least one of a woody material and a herbaceous material.

13. The memory-card holder of claim 1, wherein the one-piece, unitary tray is formed from one or more sheets of bio-degradable materials that are bonded together by at least one bonding method selected from methods including being laminated, folded, and glued together.

14. A memory-card holder, comprising:
    a one-piece, unitary tray formed entirely from a bio-degradable material, the one-piece, unitary tray including a cover portion and a bottom portion formed into the bio-degradable material of the one-piece, unitary tray, at least one of the cover portion and the bottom portion having an indentation formed therein to accept a digital memory-card; and
    a hinge integrally formed into the one-piece, unitary tray and between the cover portion and the bottom portion, the hinge being configured to allow the cover portion to fold over the bottom portion of the one-piece, unitary tray.

15. The memory-card holder of claim 14, further comprising a closure tab and an insertion slot formed on distal, opposing ends of the one-piece, unitary tray and configured to latch the cover portion and the bottom portion to one another.

16. The memory-card holder of claim 14, further comprising a closure tab and an open insertion-area formed on distal, opposing ends of the one-piece, unitary tray and configured to latch the cover portion and the bottom portion to one another.

17. The memory-card holder of claim 14, further comprising a protrusion area on at least three sides projecting outward from and substantially parallel to the cover portion and the bottom portion.

18. The memory-card holder of claim 14, wherein at least one of the cover portion and the bottom portion having the indentation is configured to hold the digital memory-card.

19. The memory-card holder of claim 18, wherein a remaining one of the cover portion and the bottom portion is that does not hold the digital memory-card is configured to apply pressure to the digital memory-card.

20. The memory-card holder of claim 14, further comprising a slot formed within the bottom portion of the one-piece, unitary tray through which an identification number of the digital memory-card may be read.

* * * * *

UNITED STATES PATENT AND TRADEMARK OFFICE
CERTIFICATE OF CORRECTION

| | | |
|---|---|---|
| PATENT NO. | : 12,389,994 B2 | Page 1 of 1 |
| APPLICATION NO. | : 18/713808 | |
| DATED | : August 19, 2025 | |
| INVENTOR(S) | : Wes Brewer et al. | |

It is certified that error appears in the above-identified patent and that said Letters Patent is hereby corrected as shown below:

In the Specification

In Column 4, Line 5, delete "CompactFlash" and insert --CompactFlash®-- therefor In Column 8, Line 18, delete "De," and insert --$D_6$,-- therefor Signed and Sealed this
Twentieth Day of January, 2026

John A. Squires
*Director of the United States Patent and Trademark Office*